(12) United States Patent
Wake et al.

(10) Patent No.: US 12,246,835 B2
(45) Date of Patent: Mar. 11, 2025

(54) DRONE, CONTROL METHOD THEREOF, AND PROGRAM

(71) Applicant: NILEWORKS INC., Tokyo (JP)

(72) Inventors: Chihiro Wake, Tokyo (JP); Hiroshi Yanagishita, Tokyo (JP)

(73) Assignee: NILEWORKS INC., Tokyo (JP)

( * ) Notice: Subject to any disclaimer, the term of this patent is extended or adjusted under 35 U.S.C. 154(b) by 1231 days.

(21) Appl. No.: 17/047,733

(22) PCT Filed: Feb. 27, 2019

(86) PCT No.: PCT/JP2019/007607
§ 371 (c)(1),
(2) Date: Oct. 15, 2020

(87) PCT Pub. No.: WO2019/168042
PCT Pub. Date: Sep. 6, 2019

(65) Prior Publication Data
US 2021/0163136 A1 Jun. 3, 2021

(30) Foreign Application Priority Data
Feb. 28, 2018 (JP) .................... 2018-035349

(51) Int. Cl.
*B64D 1/18* (2006.01)
*A01M 7/00* (2006.01)
(Continued)

(52) U.S. Cl.
CPC ............ *B64D 1/18* (2013.01); *A01M 7/0042* (2013.01); *B64U 10/13* (2023.01); *G05D 1/042* (2013.01);
(Continued)

(58) Field of Classification Search
CPC .......... B64D 1/16; B64D 1/18; A01M 7/0042; B64C 39/024; G05D 1/042; B64U 10/13;
(Continued)

(56) References Cited

U.S. PATENT DOCUMENTS 7,195,200 B2 * 3/2007 Yamane .................. B64C 13/20
701/16
9,501,060 B1 * 11/2016 Zhang .................... B64D 45/00
(Continued)

FOREIGN PATENT DOCUMENTS

JP  08-268392 A  10/1996
JP  2001-120151 A  5/2001
(Continued)

OTHER PUBLICATIONS

International Search Report and Written Opinion PCT/JP2019/007607 dated May 28, 2019.

*Primary Examiner* — Benjamin P Lee
(74) *Attorney, Agent, or Firm* — MATTINGLY & MALUR, PC

(57) ABSTRACT

An agricultural chemical spraying drone with improved safety is provided. The drone includes an altitude measurement sensor and a speed measurement sensor and controls not to exceed an altitude restriction and a speed restriction of an airframe by using a flight controller. The sensors are desirable be combination of multiple types. Particularly, the altitude is desirably measured by a GPS during take-off and by a sonar during chemical spraying. Weight of the airframe is measured from time to time, and the altitude restriction and the speed restriction may be adjusted according to the weight.

13 Claims, 4 Drawing Sheets

(51) Int. Cl.
  *B64U 10/13* (2023.01)
  *G05D 1/00* (2006.01)
  *B05B 9/06* (2006.01)
  *B64U 50/19* (2023.01)
  *B64U 101/30* (2023.01)
  *B64U 101/45* (2023.01)

(52) U.S. Cl.
  CPC .............. *B05B 9/06* (2013.01); *B64U 50/19* (2023.01); *B64U 2101/30* (2023.01); *B64U 2101/45* (2023.01); *B64U 2201/104* (2023.01)

(58) Field of Classification Search
  CPC .. B64U 2101/00; B64U 2201/104; B05B 9/06
  See application file for complete search history.

(56) References Cited

U.S. PATENT DOCUMENTS

| | | | |
|---|---|---|---|
| 9,783,293 B2* | 10/2017 | Srivastava | B64C 39/024 |
| 10,216,197 B2* | 2/2019 | Zhang | B64U 10/13 |
| 10,633,081 B2* | 4/2020 | Sugaya | A01M 1/22 |
| 10,648,850 B2* | 5/2020 | Kim | G05D 1/042 |
| 10,745,115 B2* | 8/2020 | Kimchi | B64C 25/26 |
| 10,824,149 B2* | 11/2020 | Wang | G05D 1/0016 |
| 2003/0103479 A1 | 6/2003 | Anderson et al. | |
| 2004/0075018 A1* | 4/2004 | Yamane | B64U 10/17 |
| | | | 244/17.13 |
| 2005/0230564 A1 | 10/2005 | Yamane | |
| 2012/0091257 A1* | 4/2012 | Wolff | B64U 10/20 |
| | | | 244/12.4 |
| 2016/0246304 A1* | 8/2016 | Canoy | G05D 1/0816 |
| 2016/0327956 A1 | 11/2016 | Zhang et al. | |
| 2017/0297737 A1 | 10/2017 | Arnold | |
| 2018/0229833 A1* | 8/2018 | Kimchi | B64D 31/06 |
| 2018/0259342 A1* | 9/2018 | Bitra | G01C 21/1656 |
| 2019/0118937 A1* | 4/2019 | Sugaya | A01M 5/02 |
| 2019/0121369 A1* | 4/2019 | DiRusso | G06Q 10/06315 |
| 2019/0152597 A1* | 5/2019 | Van Niekerk | B64U 30/299 |
| 2019/0339111 A1* | 11/2019 | Kim | G01G 19/12 |
| 2019/0362640 A1* | 11/2019 | Wu | G08G 5/0069 |
| 2020/0096999 A1* | 3/2020 | Pellerite | G05D 1/0016 |
| 2020/0109944 A1* | 4/2020 | Zhang | G01C 21/12 |
| 2020/0207462 A1* | 7/2020 | Kim | B64C 39/024 |
| 2020/0223543 A1* | 7/2020 | Singh | B64C 39/022 |
| 2020/0264209 A1* | 8/2020 | Ducharme | G05D 1/106 |
| 2020/0331607 A1* | 10/2020 | Yamada | G08G 5/025 |
| 2020/0361634 A1* | 11/2020 | Gil | G07C 5/0808 |
| 2021/0011492 A1* | 1/2021 | Raabe | B64D 1/22 |
| 2021/0024207 A1* | 1/2021 | Sugaki | B64C 39/024 |
| 2021/0107633 A1* | 4/2021 | Kimchi | B64C 25/26 |
| 2021/0191390 A1* | 6/2021 | Hwang | G05D 1/0038 |
| 2021/0192961 A1* | 6/2021 | Lebbos | B64F 5/60 |
| 2021/0214082 A1* | 7/2021 | Inuma | B64D 1/12 |
| 2022/0100208 A1* | 3/2022 | Karbasi | B60L 58/13 |
| 2022/0119105 A1* | 4/2022 | Schmalzried | G06Q 10/0832 |
| 2023/0035682 A1* | 2/2023 | Seo | G08G 5/0034 |
| 2023/0221166 A1* | 7/2023 | Ono | B64D 1/18 |
| | | | 177/136 |
| 2024/0126305 A1* | 4/2024 | Jia | B64U 30/20 |

FOREIGN PATENT DOCUMENTS

| | | |
|---|---|---|
| JP | 2004-130852 A | 4/2004 |
| JP | 2005-297922 A | 10/2005 |
| JP | 2005-535151 A | 11/2005 |
| JP | 2007-143098 A | 6/2007 |
| JP | 2016-135625 A | 7/2016 |
| JP | 2016-171441 A | 9/2016 |
| JP | 2017-161495 A | 9/2017 |
| JP | 2017-163265 A | 9/2017 |
| JP | 2018-502008 A | 1/2018 |

* cited by examiner

DRONE, CONTROL METHOD THEREOF, AND PROGRAM

TECHNICAL FIELD

The present invention relates to an agricultural unmanned aerial vehicle (drone) for chemical spraying, such as pesticides, to a farm field, in particular, a drone with improved safety, and a control method and a control program therefor.

BACKGROUND ART

An application of small helicopters (multicopters) generally called drones is in progress. One of the important fields of application thereof is spraying of chemicals such as pesticides or liquid fertilizers to a farmland (a farm field) (for example, Patent Literature 1). In Japan where the farmland is smaller than in the Europe and the U.S., drones are more suitable than manned airplanes and helicopters in many cases.

Technologies such as a Quasi-Zenith Satellite System and a Real Time Kinematic-Global Positioning System (RTK-GPS) allow a drone to accurately know the absolute position of the own plane in centimeters during flight. Thus, even in the typical small and complex farmland in Japan, it is possible to fly a drone autonomously with minimum manual control and to spray chemicals efficiently and accurately.

On the other hand, in some cases, safety considerations were not sufficient for autonomous drones intended for spraying agricultural chemicals. Since a drone loaded with chemicals weighs several tens of kilograms, a case of an accident such as falling onto a person may have serious consequences. Further, the operator of a drone is usually not an expert, so therefore a foolproof mechanism is required, but the consideration for this was insufficient. Until now, there have been drone safety technologies based on human control (for example, Patent Literature 2), but there was no technology for addressing safety issues specific to autonomous drones for spraying agricultural chemicals.

CITATION LIST

Patent Literature

Patent Literature 1: JP 2001-120151 A
Patent Literature 2: JP 2017-163265 A

SUMMARY OF INVENTION

Technical Problem

An agricultural drone (unmanned aerial vehicle) that is able to maintain high level of safety even during autonomous flight is provided.

Solution to Problem

In the present invention, the above-described problem is solved by providing a drone. The drone includes an altitude measurement unit and an altitude adjustment unit. The altitude adjustment unit adjusts an airframe altitude, measured by the altitude measurement unit, for the airframe altitude not to exceed a predetermined marginal altitude.

Further, in the present invention, the above-described problem is solved by providing the drone described in paragraph 0007. In the drone, the altitude measurement unit includes two or more methods, or one or more methods multiplexed, selected from a sonar, a barometric pressure sensor, an acceleration sensor, a laser, or a GPS.

Further, in the present invention, the above-described problem is solved by providing the drone described in paragraph 0007 or paragraph 0008. In the drone, the altitude measurement unit measures the airframe altitude by using the GPS during a take-off and measures the airframe altitude by using the sonar while moving over a farm field.

Further, in the present invention, the above-described problem is solved by providing the drone described in paragraph 0009. In the drone, the altitude adjustment unit adjusts the airframe altitude not to exceed a second marginal altitude, lower than the predetermined marginal altitude, while the altitude measurement unit measures the airframe altitude by using the GPS.

Further, in the present invention, the above-described problem is solved by providing the drone described in paragraph 0007, paragraph 0008, paragraph 0009, or paragraph 0010. In the drone, the altitude measurement unit further measures climbing speed of the airframe, and the altitude adjustment unit adjusts the airframe altitude for the climbing speed not to exceed a predetermined marginal altitude.

Further, in the present invention, the above-described problem is solved by providing the drone described in paragraph 0007, paragraph 0008, paragraph 0009, paragraph 0010, or paragraph 0011. The drone further includes a weight measurement unit. In the drone, the altitude adjustment unit adjusts the predetermined marginal altitude according to airframe weight, measured by the weight measurement unit.

Further, in the present invention, the above-described problem is solved by providing a drone. The drone includes a speed measurement unit and a speed adjustment unit. In the drone, the speed adjustment unit adjusts an airframe speed, measured by the speed measurement unit, for the airframe speed not to exceed a predetermined marginal speed.

Further, in the present invention, the above-described problem is solved by providing the drone described in paragraph 0013. In the drone, the speed measurement unit includes two or more methods and multiplexed, selected from an acceleration sensor, a GPS doppler, or a GPS.

Further, in the present invention, the above-described problem is solved by providing the drone described in paragraph 0013 or paragraph 0014. The drone further includes a weight measurement unit. In the drone, the speed measurement unit adjusts the predetermined marginal speed according to airframe weight, measured by the weight measurement unit.

Further, in the present invention, the above-described problem is solved by providing the drone described in paragraph 0012 or paragraph 0015. In the drone, the weight measurement unit measures the airframe weight based on any one or more information: a relation between a target rotation speed instructed to a motor and an acceleration measured by the acceleration sensor; a relation between the target rotation speed instructed to the motor and an acceleration measured by GPS coordinates; a relation between a rotation speed of a rotor blade and the acceleration measured by the acceleration sensor; a relation between the rotation speed of the rotor blade and the acceleration measured by the GPS coordinates; a forward tilt angle of the airframe during a constant velocity horizontal flight; and a liquid amount of loaded chemicals.

Further, in the present invention, the above-described problem is solved by providing the drone described in paragraph 0007, paragraph 0008, paragraph 0009, paragraph 10, paragraph 0011, paragraph 0007, paragraph 0008, paragraph 0009, paragraph 0010, paragraph 0011, paragraph 0012, paragraph 0013, paragraph 0014, paragraph 0015, or paragraph 0016. The drone further includes an airframe control unit. In the drone, the airframe control unit maintains the airframe hovering, or lands the airframe when the GPS is not used for more than a specified time.

Further, in the present invention, the above-described problem is solved by providing the drone described in paragraph 0007, paragraph 0008, paragraph 0009, paragraph 0010, paragraph 0011, paragraph 0012, paragraph 0013, paragraph 0014, paragraph 0015, paragraph 0016, or paragraph 0017. The drone includes multiple GPS receivers, and each of the multiple GPS receivers is controlled to use a different GPS satellite for each.

Further, in the present invention, the above-described problem is solved by providing a drone control method. The drone control method includes an altitude measuring step, measuring an airframe altitude, and an altitude adjusting step, adjusting the airframe altitude for the measured airframe altitude not to exceed a predetermined marginal altitude.

Further, in the present invention, the above-described problem is solved by providing the drone control method described in paragraph 0019. In the drone control method, the altitude measuring step uses two or more methods selected from a sonar, a barometric pressure sensor, an acceleration sensor, a laser, or a GPS, to measure the airframe altitude.

Further, in the present invention, the above-described problem is solved by providing the drone control method described in paragraph 0019 or paragraph 0020. In the drone control method, the altitude measuring step measures the airframe altitude by using GPS during a take-off and measures the airframe altitude by using the sonar while moving over a farm field.

Further, in the present invention, the above-described problem is solved by providing the drone control method described in paragraph 0021. In the drone control method, the altitude adjusting step adjusts the airframe altitude not to exceed a second marginal altitude, lower than the predetermined marginal altitude, while the altitude measuring step measures the airframe altitude by using the GPS.

Further, in the present invention, the above-described problem is solved by providing the drone control method described in paragraph 0019, paragraph 0020, paragraph 0021, or paragraph 0022. In the drone control method, the altitude measuring step further measures climbing speed of the airframe, and the altitude adjusting step further adjusts the airframe altitude for the climbing speed not to exceed the predetermined marginal altitude.

Further, in the present invention, the above-described problem is solved by providing the drone control method described in paragraph 0019, paragraph 0020, paragraph 0021, paragraph 0022, or paragraph 0023. The drone control method further includes a weight measuring step to measure airframe weight. In the drone control method, the altitude adjusting step adjusts the predetermined marginal altitude according to the airframe weight, measured at the weight measuring step.

Further, in the present invention, the above-described problem is solved by providing a drone control method. The drone control method includes a speed measuring step measuring an airframe speed, and a speed adjusting step adjusting the airframe speed for the measured airframe speed not to exceed a predetermined marginal speed.

Further, in the present invention, the above-described problem is solved by providing the drone control method described in paragraph 0025. In the drone control method, the speed measuring step measures an airframe speed by using two or more methods, selected from an acceleration sensor, a GPS doppler, or a GPS.

Further, in the present invention, the above-described problem is solved by providing the drone control method described in paragraph 0025, or paragraph 0026. The drone control method further includes a weight measuring step. In the drone control method, the speed adjusting step adjusts the predetermined marginal speed according to measured airframe weight.

Further, in the present invention, the above-described problem is solved by providing the drone control method described in paragraph 0024, or paragraph 0027. In the drone control method, the weight measuring step measures the airframe weight based on any one or more information: a relation between a target rotation speed instructed to a motor and an acceleration measured by the acceleration sensor; a relation between the target rotation speed instructed to the motor and an acceleration measured by GPS coordinates; a relation between a rotation speed of a rotor blade and the acceleration measured by the acceleration sensor; a relation between the rotation speed of the rotor blade and the acceleration measured by the GPS coordinates; a forward tilt angle of the airframe during a constant velocity horizontal flight; and a liquid amount of loaded chemicals.

Further, in the present invention, the above-described problem is solved by providing the drone control method described in paragraph 0019, paragraph 0020, paragraph 0021, paragraph 0022, paragraph 0023, paragraph 0024, paragraph 0025, paragraph 0026, paragraph 0027, or paragraph 0028. The drone control method further includes a step to maintain the airframe hovering, or land the airframe when the GPS is not used for more than a specified time.

Further, in the present invention, the above-described problem is solved by providing the drone control method described in paragraph 0019, paragraph 0020, paragraph 0021, paragraph 0022, paragraph 0023, paragraph 0024, paragraph 0025, paragraph 0026, paragraph 0027, paragraph 28, or paragraph 0029. The drone control method further includes a controlling step to control multiple GPS receivers to use a different GPS satellite for each.

Further, in the present invention, the above-described problem is solved by providing a drone control program. The drone control program causes a computer to execute an altitude measurement instruction to measure an airframe altitude, and an altitude adjustment instruction to adjust the airframe altitude for the measured airframe altitude not to exceed a predetermined marginal altitude.

Further, in the present invention, the above-described problem is solved by providing the drone control program described in paragraph 0031. In the drone control program, the altitude measurement instruction includes an instruction to use two or more methods selected from a sonar, a barometric pressure sensor, an acceleration sensor, a laser, or a GPS, to measure the airframe altitude.

Further, in the present invention, the above-described problem is solved by providing the drone control program described in paragraph 0031 or paragraph 0032. In the drone control program, the altitude measurement instruction includes an instruction to measure the airframe altitude by using GPS during a take-off and to measure the airframe altitude by using the sonar while moving over a farm field.

Further, in the present invention, the above-described problem is solved by providing the drone control program described in paragraph 0033. In the drone control program, the altitude measurement instruction includes an instruction to adjust the airframe altitude not to exceed a second marginal altitude, lower than the predetermined marginal altitude, while the airframe altitude is measured by using the GPS.

Further, in the present invention, the above-described problem is solved by providing the drone control program described in paragraph 0031, paragraph 0032, paragraph 0033, or paragraph 0034. In the drone control program, the altitude measurement instruction further includes an instruction to measure climbing speed of the airframe, and the altitude adjustment instruction further includes an instruction to adjust the airframe altitude for the climbing speed not to exceed a predetermined marginal altitude.

Further, in the present invention, the above-described problem is solved by providing the drone control program described in paragraph 0031, paragraph 0032, paragraph 0033, paragraph 0034, or paragraph 0035. The drone control program further causes a computer to execute a weight measurement instruction to measure airframe weight. In the drone control program, the altitude adjustment instruction includes an instruction to adjust the predetermined marginal altitude according to the measured airframe weight.

Further, in the present invention, the above-described problem is solved by providing the drone control program. The drone control program causes a computer to execute a speed measurement instruction to measure an airframe speed, and a speed adjustment instruction to adjust the airframe speed for the measured airframe speed not to exceed a predetermined marginal speed.

Further, in the present invention, the above-described problem is solved by providing the drone control program described in paragraph 0037. In the drone control program, the speed measurement instruction measures an airframe speed by using two or more methods, selected from an acceleration sensor, a GPS doppler, or a GPS.

Further, in the present invention, the above-described problem is solved by providing the drone control program described in paragraph 0037 or paragraph 0038. The drone control program further causes a computer to execute a weight measurement instruction to measure an airframe weight. In the drone control program, the speed adjustment instruction includes an instruction to adjust the predetermined marginal speed according to measured airframe weight.

Further, in the present invention, the above-described problem is solved by providing the drone control program described in paragraph 0036 or paragraph 0039. In the drone control program, the weight measurement instruction measures the airframe weight based on any one or more information: a relation between a target rotation speed instructed to a motor and an acceleration measured by the acceleration sensor; a relation between the target rotation speed instructed to the motor and an acceleration measured by GPS coordinates; a relation between a rotation speed of a rotor blade and the acceleration measured by the acceleration sensor; a relation between the rotation speed of the rotor blade and the acceleration measured by the GPS coordinates; a forward tilt angle of the airframe during a constant velocity horizontal flight; and a liquid amount of loaded chemicals. Incidentally, it is desirable to put the airframe in a hovering state when the GPS radio wave cannot be received for more than a specified time.

Further, in the present invention, the above-described problem is solved by providing the drone control program described in paragraph 0031, paragraph 0032, paragraph 0033, paragraph 0034, paragraph 0035, paragraph 0036, paragraph 0037, paragraph 0038, paragraph 0039, or paragraph 0040. The drone control program further causes a computer to execute an instruction to maintain the airframe hovering, or land the airframe when the GPS is not used for more than a specified time.

Further, in the present invention, the above-described problem is solved by providing the drone control program described in paragraph 0031, paragraph 0032, paragraph 0033, paragraph 0034, paragraph 0035, paragraph 0036, paragraph 0037, paragraph 0038, paragraph 0039, paragraph 0040, or paragraph 0041. The drone control program further includes a controlling step to control multiple GPS receivers to use a different GPS satellite for each.

Incidentally, the computer program can be provided by being downloaded via a network such as the Internet, or can be provided by being recorded in various computer-readable recording media such as a CD-ROM.

Advantageous Effects of Invention

An agricultural drone (unmanned aerial vehicle) that is able to maintain high level of safety even during autonomous flight is provided.

DESCRIPTION OF EMBODIMENTS

Hereinafter, modes for carrying out the present invention will be described with reference to the drawings. The drawings are all examples.

Figure 1:
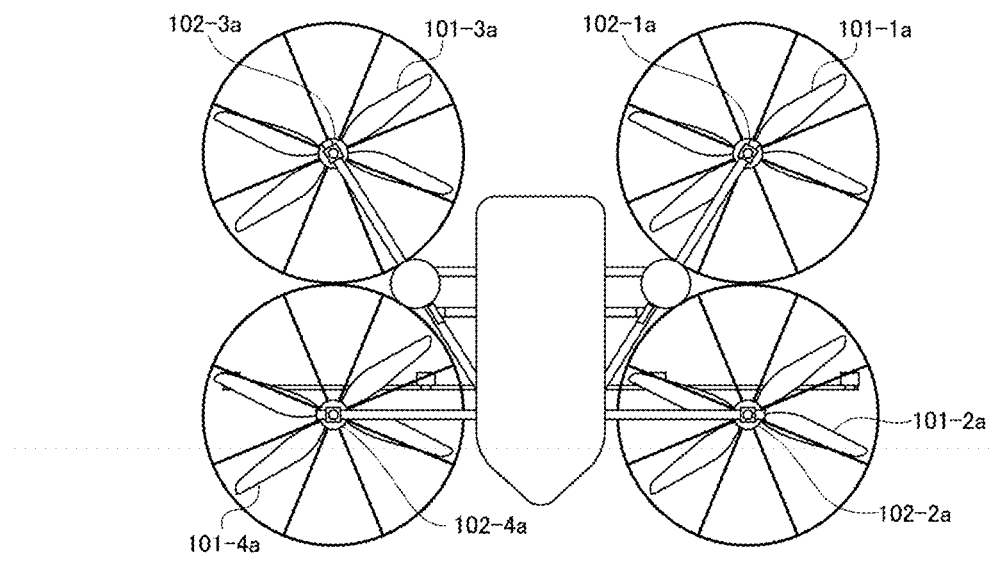
FIG. 1 is a plan view of an embodiment of a drone for chemical spraying according to the present invention.
Figure 2:
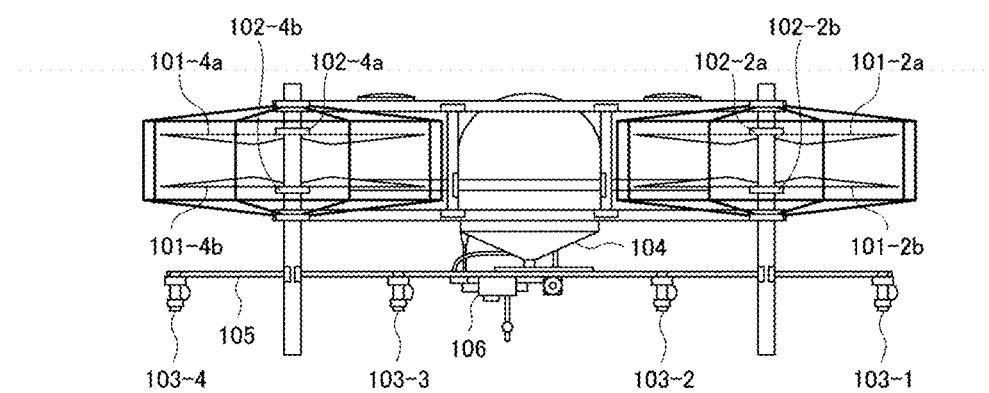
FIG. 2 is a front view of the embodiment of the drone for chemical spraying according to the present invention.
Figure 3:
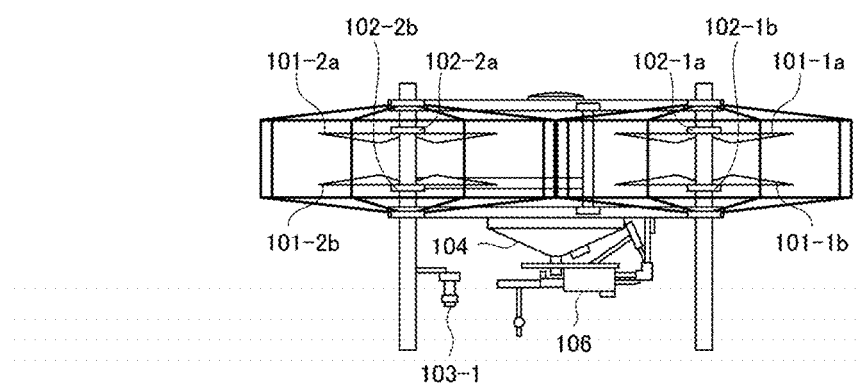
FIG. 3 is a right side view of the embodiment of the drone for chemical spraying according to the present invention.

FIG. 1 is a plan view of an embodiment of a drone (100) according to the present invention, FIG. 2 is a front view (viewed from a traveling direction side), and FIG. 3 is a right side view thereof. Incidentally, in this description, a drone is defined as a general flight vehicle having multiple rotor blades or flight units, regardless of a power means (electric power, prime mover, or the like), an operating system (wireless or wired, autonomous or manual flight type, or the like).

Rotor blades (101-1a, 101-1b, 101-2a, 101-2b, 101-3a, 101-3b, 101-4a, and 101-4b) (also called rotors) are units for flying the drone (100). It is desirable that eight rotor blades (four sets of two-stage rotor blades) are provided in consideration of the balance of flight stability, airframe size, and battery consumption.

Motors (102-1a, 102-1b, 102-2a, 102-2b, 102-3a, 102-3b, 102-4a, and 102-4b) are units (which are typically an electric motor but may be a motor or the like) for rotating the rotor blades (101-1a, 101-1b, 101-2a, 101-2b, 101-3a, 101-3b, 101-4a, and 101-4b), and it is desirable that one motor be installed in one rotor blade. In the upper and lower rotor blades (for example, 101-1a and 101-1b) and the corresponding motors (for example, 102-1a and 102-1b) in one set, desirably, axes are collinear and rotate in directions opposite to each other for the flight stability of the drone. Incidentally, although a part of the rotor blades (101-3b) and a part of the motors (102-3b) are not illustrated, their positions are obvious, and are illustrated if there is a left side view. As illustrated in FIGS. 2 and 3, desirably, a radial member for supporting a propeller guard, which is provided such that a rotor does not interfere with foreign matters, is desirably not horizontal but a roof structure. The structure promotes the buckling deformation of the member toward the rotor at the time of collision to prevent the member from interfering with the rotor.

Chemical nozzles (103-1, 103-2, 103-3, and 103-4) are units for spraying chemicals downward, and four chemical nozzles are preferably provided. Incidentally, in this description, the chemicals are generally referred to as liquids or powders sprayed on farm field such as pesticides, herbicides, liquid fertilizers, insecticides, seeds, and water.

A chemical tank (104) is a tank for storing chemicals to be sprayed, and is preferably provided at a position close to the center of gravity of the drone (100) and lower than the center of gravity from the viewpoint of weight balance. Chemical hoses (105-1, 105-2, 105-3, and 105-4) are units for connecting the chemical tank (104) with respective chemical nozzles (103-1, 103-2, 103-3, and 103-4). The chemical hoses are made of a hard material and may also serve to support the chemical nozzle. A pump (106) is a unit for discharging the chemicals from the nozzle.

Figure 4:
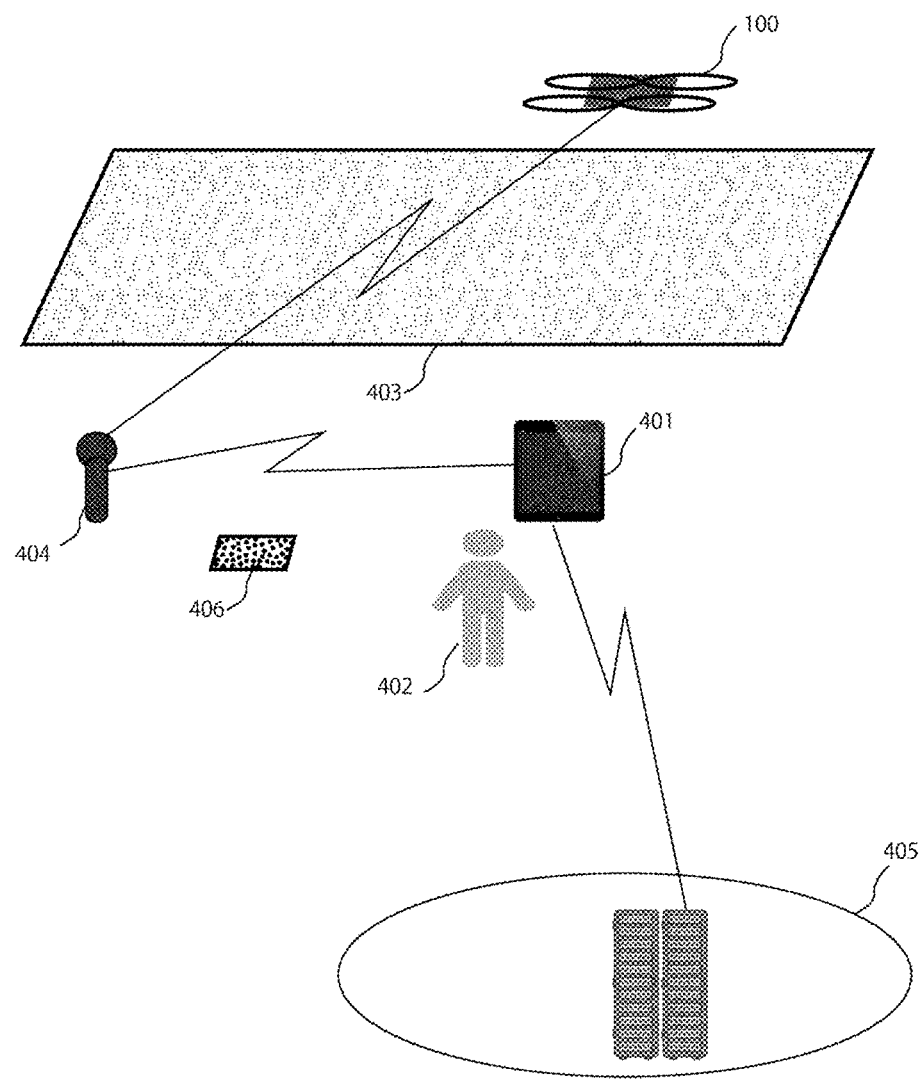
FIG. 4 is an example of an overall conceptual view of a chemical spraying system using the embodiment of the drone for chemical spraying according to the present invention.

FIG. 4 illustrates an overall conceptual view of a system using an embodiment of a chemical spraying application of the drone (100) according to the present invention. This drawing is a schematic view, and the scale is not accurate. A remote controller (401) is a unit for transmitting an instruction to the drone (100) by the operation of a user (402) and displaying information (for example, a position, a chemical amount, a battery level, and a camera image) received from the drone (100). The remote controller may be realized by a portable information device such as a general tablet terminal for operating a computer program. It is desirable that the drone (100) according to the present invention be controlled to perform autonomous flight. However, a manual operation is desirably performed at the time of basic operation such as take-off and return and at the time of emergency. In addition to portable information devices, an emergency operation device (not illustrated) having an exclusive emergency stop function may be used (desirably, the emergency operation device is a dedicated device which is equipped with a large emergency stop button or the like so as to be able to respond quickly in case of emergency). It is desirable that the remote controller (401) and the drone (100) perform wireless communication by Wi-Fi or the like.

A farm field (403) is a rice field, an upland field, or the like targeted for chemical spraying by the drone (100). Actually, the topography of the farm field (403) is complicated, and there is a case where the topographic map cannot be obtained in advance, or the topographic map and the situation of the site are inconsistent. Usually, the farm field (403) is adjacent to a house, a hospital, a school, a farm field for other crops, a road, a railroad, and the like. Further, there may also be obstacles such as buildings and electric wires in the farm field (403).

A base station (404) is a device which provides a master unit function of Wi-Fi communication and the like. Desirably, the base station also functions as an RTK-GPS base station to provide the accurate position of the drone (100) (the master unit function of Wi-Fi communication and the RTK-GPS base station may be independent devices). A farm cloud (405) is typically a group of computers operated on a cloud service and related software, and it is desirable that the farm cloud (405) is wirelessly connected to the remote controller (401) via a mobile phone line or the like. The farm cloud (405) may analyze the image of the farm field (403) photographed by the drone (100), grasp the growth status of crops, and perform processing for determining a flight route. Further, the drone (100) may be provided with the stored topographical information or the like of the farm field (403). In addition, the history of the flight of the drone (100) and photographed images may be accumulated to perform various analysis processes.

Usually, the drone (100) takes off from a landing point (406) outside the farm field (403), and returns to the landing point (406) after spraying chemicals on the farm field (403), or when it becomes necessary to replenish the chemicals or charge. A flight route (entry route) from the landing point (406) to the target farm field (403) may be stored in advance in the farm cloud (405) or the like, or may be inputted by the user (402) before starting take-off.

Figure 5:
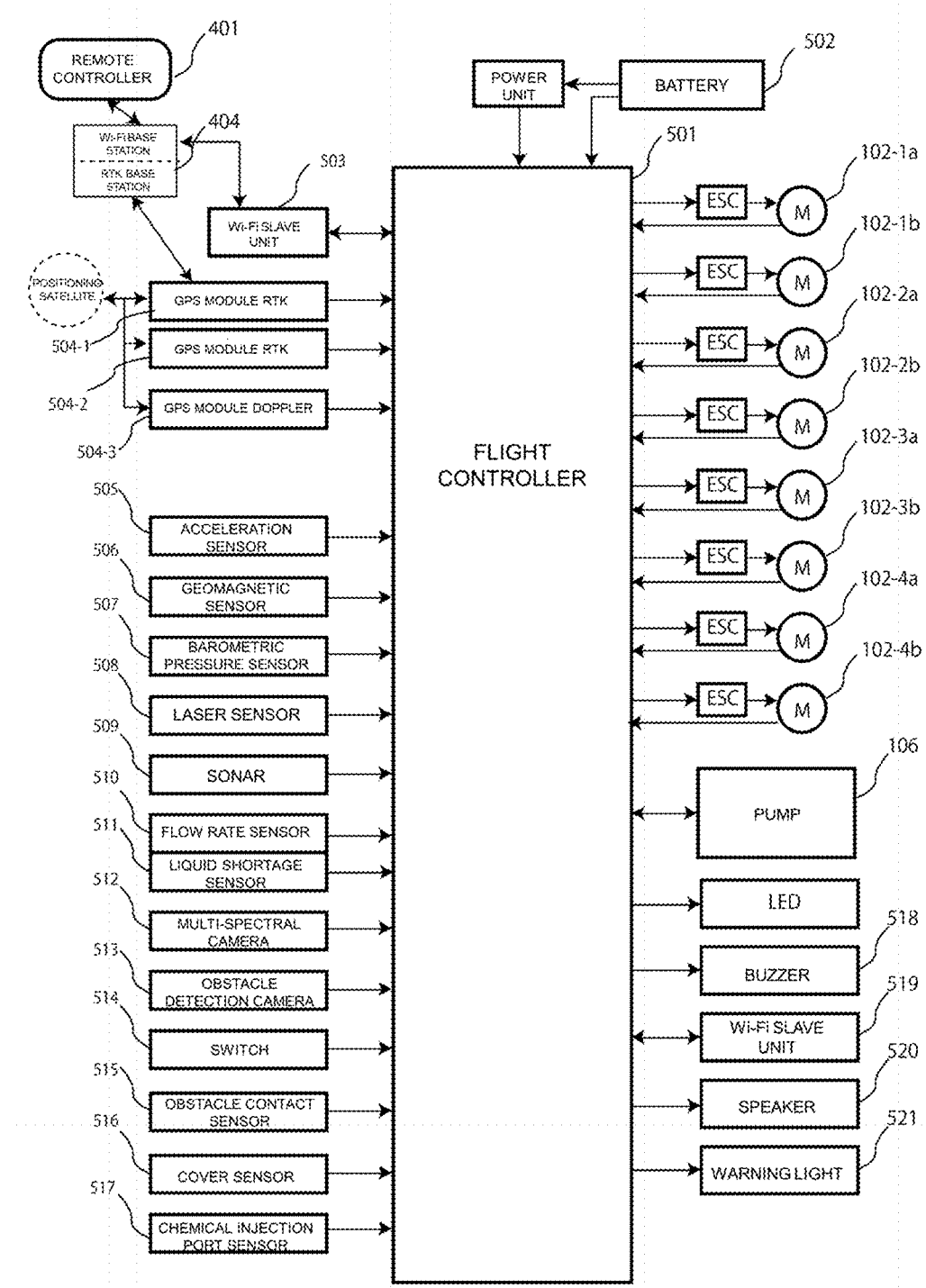
FIG. 5 is a schematic diagram illustrating a control function of the embodiment of the drone for chemical spraying according to the present invention.

FIG. 5 is a schematic diagram illustrating a control function of the embodiment of the chemical spraying drone according to the present invention. A flight controller (501) is a component which controls the entire drone, and specifically may be an embedded computer including a CPU, memory, related software, and the like. The flight controller (501) controls the flight of the drone (100) by controlling the rotation speed of the motors (102-1a, 102-1b, 102-2a, 102-2b, 102-3a, 102-3b, 102-4a, and 102-4b) with control means such as electronic speed control (ESC) on the basis of the input information received from the remote controller (401) and the input information obtained from various sensors described later. It is desirable to have a configuration that the actual rotation speed of the motors (102-1a, 102-1b, 102-2a, 102-2b, 102-3a, 102-3b, 102-4a, and 102-4b) is fed back to the flight controller (501) to monitor whether or not a normal rotation is performed. Alternatively, the rotor blade (101) may be provided with an optical sensor or the like so that the rotation of the rotor blade (101) is fed back to the flight controller (501).

The software used by the flight controller (501) is preferably rewritable through a storage medium or the like for function expansion/change, problem correction, or the like, or through communication means such as Wi-Fi communication or USB. In this case, it is desirable that the protection by encryption, checksum, electronic signature, virus check software, and the like prevents rewriting performed by unauthorized software. In addition, a part of a calculation process used in the control by the flight controller (501) may be executed by another computer existing on the remote controller (401), the farm cloud (405), or another place. Since the flight controller (501) is highly important, some or all of the components thereof may be duplexed.

A battery (502) is a unit which supplies power to the flight controller (501) and other components of the drone, and is desirably rechargeable. The battery (502) is desirably connected to the flight controller (501) via a fuse or a power supply unit including a circuit breaker or the like. The battery (502) is desirably a smart battery which has a function of transmitting the internal state (such as the amount of stored electricity and accumulated usage time) of the battery to the flight controller (501) in addition to a power supply function.

Desirably, the flight controller (501) interacts with the remote controller (401) via a Wi-Fi slave unit function (503) and further via the base station (404) so as to receive a necessary instruction from the remote controller (401) and transmit necessary information to the remote controller (401). In this case, it is desirable to encrypt the communication so as to prevent illegal acts such as interception, spoofing, and hijacking of equipment. The base station (404) desirably has an RTK-GPS base station function in addition to a Wi-Fi communication function. By combining a signal from the RTK base station and a signal from a GPS positioning satellite, a GPS module (504) can measure the absolute position of the drone (100) with an accuracy of about several centimeters. Since the GPS module (504) is highly important, it is desirable to duplex and multiplex the GPS module (504). Further, in order to handle a failure of a specific GPS satellite, each of redundant GPS modules (504) is desirably controlled to use another satellite.

An acceleration sensor (505) is a unit which measures the acceleration of a drone body (further, a unit which calculates a speed by integrating the acceleration), and is desirably a six-axis sensor. A six-axis gyro sensor, a three-axis angle sensor, or both may be used instead of or in addition to the acceleration sensor (505). A geomagnetic sensor (506) is a unit which measures the direction of the drone body by measuring geomagnetism. A barometric pressure sensor (507) is a unit which measures atmospheric pressure, and can indirectly measure the altitude of the drone. A laser sensor (508) is a unit which measures a distance between the drone body and a ground surface by utilizing the reflection of laser light, and desirably uses an IR (infrared) laser. A sonar (509) is a unit which measures the distance between the drone body and the ground surface by utilizing the reflection of sound waves such as ultrasonic waves. These sensors may be selected according to the cost target and performance requirements of the drone. Further, a gyro sensor (angular velocity sensor) for measuring the tilt of the airframe, a wind force sensor for measuring wind force, and the like may be added. Further, it is desirable that these sensors be duplexed or multiplexed. In a case where there are multiple sensors for the same purpose, the flight controller (501) may use only one of the sensors, and when the sensor fails, the sensor may be switched to use an alternative sensor. Alternatively, a plurality of sensors may be used at the same time, and a case where respective measurement results do not match may be considered that a failure occurs.

A flow rate sensor (510) is a unit for measuring the flow rate of the chemicals, and the flow rate sensors are desirably provided at a plurality of places on the path from the chemical tank (104) to the chemical nozzle (103). A liquid shortage sensor (511) is a sensor which detects that the amount of the chemicals is equal to or less than a predetermined amount. A multi-spectral camera (512) is a unit which photographs the farm field (403) and obtains data for image analysis. An obstacle detection camera (513) is a camera for detecting drone obstacles. The obstacle detection camera has different image characteristics and lens direction from those of the multi-spectral camera (512), so that it is desirable that the obstacle detection camera is different from the multi-spectral camera (512). A switch (514) is a unit for the user (402) of the drone (100) to make various settings. An obstacle contact sensor (515) is a sensor for detecting that the drone (100), particularly, a rotor or a propeller guard part thereof is in contact with an obstacle such as an electric wire, a building, a human body, a standing tree, a bird, or other drone. A cover sensor (516) is a sensor which detects that an operation panel of the drone (100) and a cover for internal maintenance are open. A chemical injection port sensor (517) is a sensor which detects that the injection port of the chemical tank (104) is open. These sensors may be selected according to the cost target and performance requirements of the drone and may be duplexed or multiplexed. Further, a sensor may be provided at the base station (404) outside the drone (100), the remote controller (401), or other places, and the read information may be transmitted to the drone. For example, a wind force sensor may be provided in the base station (404), and information regarding wind force and a wind direction may be transmitted to the drone (100) via Wi-Fi communication.

The flight controller (501) transmits a control signal to the pump (106) to adjust the discharging amount of the chemicals and stop the chemical discharging. It is desirable that the current status (for example, the rotation speed) of the pump (106) is fed back to the flight controller (501).

An LED is a display unit for notifying a drone operator of the state of the drone. Instead of or in addition to the LED, a display unit such as a liquid crystal display may be used. A buzzer (518) is an output unit for notifying a drone state (particularly an error state) by an audio signal. A Wi-Fi slave unit function (519) is an optional component for communicating with an external computer or the like for the transfer of software, for example, separately from the remote controller (401). Instead of or in addition to the Wi-Fi slave unit function, another wireless communication means such as infrared communication, Bluetooth (registered trademark), ZigBee (registered trademark), and NFC or wired communication means such as USB connection may be used. A speaker (520) is an output unit for notifying the drone state (particularly an error state) by the recorded human voice, synthesized voice, or the like. Depending on the weather conditions, it may be difficult to see the visual display of the drone (100) in flight, and in such a case, it is effective to communicate the situation by voice. A warning light (521) is a display unit such as a strobe light for notifying the drone state (particularly an error state). These input/output units may be selected according to the cost target and performance requirements of the drone and may be duplexed or multiplexed.

For the agricultural drone for chemical spraying by autonomous flight, maintaining an upper limit of altitude and speed of the drone is extremely important for maintaining safety. However, the user (402) does not always stay with the remote controller (401) to control. When the altitude of the drone (100) exceeds the specified altitude, an impact of a ground collision in case of falling may exceed safety regulations (it may cause a serious damage in case of a collision with a person). In addition, it is desirable to limit the altitude to minimize scattering (drift) of chemicals outside of the target farm field. Similarly, it is going to be a big safety problem when the speed of the drone (100) exceeds a predetermined speed. In addition to falling, the impact of collision with the obstacle (especially a human) may exceed safety standards.

To comply with the safety standards, it is desirable for the drone (100) in the present invention to have one or both of an altitude measurement unit or a speed measurement unit for inputs to the flight controller (501). In addition, a weight measurement unit may be included. It is desirable for the flight controller (501) to use these measured information as inputs and to control the motor (102) not to exceed a predetermined altitude restriction, a predetermined speed restriction, or both.

(Altitude Measurement)

The drone (100) in the present invention desirably measures the airframe altitude by using multiple sensors. A combination of the GPS (504), the acceleration sensor (505), the barometric pressure sensor (507), the sonar (509), and the laser sensor (508) may be used for measuring the altitude. Further, a distance to the ground may be measured by having a passive autofocus function to the multi-spectral camera (512) or the obstacle detection camera (513). In this case, it is desirable to duplicate or to multiplex a measuring equipment and a sensor in case of failure. Duplication or multiplexing may be performed by using one or in combination of a plurality of sensors of the same type, or a plurality of types of sensors.

For example, the sonar (509) is able to measure accurately when the farm field (403) is a ground surface, but it is difficult to measure accurately when the farm field (403) is a water surface (in this case, the laser sensor (508) is appropriate). Thus, it is desirable to use multiple types of sensors since there are strengths and weaknesses depending on measurement methods. Further, in the event of GPS radio disturbance or a base station trouble, it becomes an overall failure even if the GPS (504) is multiplexed. Therefore, it is desirable to have an altitude measuring unit other than GPS.

In particular, it is desirable to use the GPS (504) for initial altitude measurements during take-off and the sonar (509) during flight. Since the GPS (504) is able to measure most accurately, but only an absolute altitude, an accurate ground altitude may not be measured on an uneven farm field (403), such as an irrigation canal. On the other hand, the sonar (509) is able to measure an accurate ground altitude for measuring distance to the ground. During horizontal flight, both the GPS (504) and the sonar (509) are used for measuring, and results are compared. When a difference is within a predetermined threshold value (e.g. 10 centimeters), a measured value of the GPS (504) is used as the altitude measurement. When the difference is over the predetermined threshold value, it is determined that unevenness of the farm field (403) is severe, and a measured value of the sonar (509) is used as the altitude measurement.

In addition, when the GPS (504) does not function because of a failure or disturbance, it is desirable to perform control to prohibit take-off (interlock) of the drone since the GPS (504) is an indispensable function in any case for grasping the flight position of the drone. Further, it is desirable to control the drone (100) to stop (hover) on a spot when the radio waves from the GPS satellites are blocked during flight and becomes temporary unable to receive, when the communication is interrupted and becomes unable to receive, or when the GPS does not work for an abnormality at the base station (404). When the GPS does not work for a predetermined time, the hovering may be stopped, the drone (100) may be soft-landed on the spot, or controlled to return to the landing point. At this time, an error message may be displayed on a remote controller (401) to ask for instructions of the user (402).

Setting an altitude information measured by the altitude measurement unit as an input of the flight control unit of the drone (100), it is possible to fly the drone (100) within the altitude restriction stipulated by laws and regulations and safety standards, without considering human sight.

When the altitude is measured by the GPS (504), it is desirable to set the altitude restriction lower than when measuring by the sonar (509). This is because it is desirable to have a margin at the altitude restriction in consideration of geographical heights since the GPS measures an absolute value of the altitude of the drone (100) while the sonar (509) measures a distance between the ground surface and the drone (100). For example, the altitude restriction measured by the GPS (504) is 1.5 meters while the altitude restriction measured by the sonar (509) is 2 meters.

In addition to the absolute altitude restriction of the drone (100), climbing speed (altitude changes over time) may be restricted. If the climbing speed is not restricted, there is a risk that the drone (100) temporarily exceeds the altitude restriction due to a delay of the sensor and a delay of processes of the controller (501) etc. In this case, when the altitude is measured by the GPS (504), an upper limit of climbing speed may be set lower than when measuring the altitude by the sonar (509) or other methods. It is because there is a high risk that the drone temporarily exceed the altitude restriction since the GPS (504) may not measure temporarily due to radio disturbance or conditions of positioning satellites.

(Speed Restriction)

The drone (100) according to the present invention may measure the airframe speed by using multiple sensors. The acceleration sensor (505) (the speed is obtained by integrating acceleration), a GPS doppler (504-3) (the airframe speed is measured by processing phase differences of radio waves from multiple GPS base stations with a software), or changes of the absolute coordinates measured by the GPS (504) and others are used for measuring the speed. In this case, it is desirable to duplicate or multiplex a measuring instrument or a sensor in case of failure. Further, it is desirable to prepare duplication or multiplexing within the same method and between different methods. For example, when the GPS is not working due to the radio disturbance or failure of the positioning satellites, it becomes overall failure if only the GPS is duplicated.

Setting speed information measured by these altitude measurement units as an input of the flight controller (501), it is possible to fly the drone (100) within a predetermined speed restriction (for example, 20 kilo meters per an hour) stipulated by laws and regulations and safety standards, without considering human sight.

(Weight Measurement)

In the case of chemical spraying by a typical drone (100), weight of chemicals becomes more than 10 kilo grams. Since weight of the airframe is typically about 25 kilo grams, it makes a big difference in a total weight between a start of spraying and an end of praying. The altitude and speed of the drone (100) may be adjusted in accordance with changes of the total weight. For example, if the safety standards specify an impact force of the drone (100) on the ground when falling naturally, the altitude restriction may be higher when the weight of the airframe is light since the impact force is determined by an altitude, a speed, and a weight (proportional to the square of the speed, and proportional to the altitude and the weight). Similarly, the speed restriction may be faster when the weight of the airframe is light. Further, the altitude restriction may be lowered when the flight speed is fast, and the speed restriction may be slower when the flight altitude is high.

The weight of the airframe is estimated by using the acceleration measured by the acceleration sensor (505) or the acceleration as a derivative of the speed measured by the GPS doppler (504-3) or the GPS (504). At a time of climbing, if a thrust of the motor (102) is T, a gravitational acceleration is g, and a measured acceleration of the airframe is a, the total weight M of the airframe is calculated as M=T/(α+g). Since the thrust T of the motor (102) is determined by a rotation speed of the motor, and the flight controller (501) is able to measure the rotation speed of the motor, the weight of the airframe is able to be estimated. Further, if the rotation speed of the motor may not be measured directly, a target rotation speed instructed by the flight controller (501) is regarded as the rotation speed of the motor to estimate the thrust.

Further, the weight of the airframe is estimated by measuring airframe tilt of the drone (100) during a constant velocity horizontal flight. The tilt of the airframe may be measured by the gyro sensor, or may be estimated by integrating measured value of the angular velocity sensor. During the constant velocity horizontal flight, an air resistance, a gravity, and a torque of the airframe are balanced. Since the air resistance is a function of a flight speed of the airframe, the thrust by the torque is a function of the rotation speed of the motor, and the gravity is a function of the weight of the airframe, the weight is able to be estimated if the airframe tilt, the rotation speed of the motor, and the flight speed of the airframe are known. Furthermore, a coefficient of air resistance may be adjusted by a wind power and a wind direction by having a wind force sensor.

Further, since the biggest factor for changes of the weight during flight is the amount of the chemicals, remaining amount of the chemicals are measured by using a level sensor in the chemical tank, that is measuring a level of the chemicals from its liquid surface, and the total weight of the airframe may be estimated. In this case, the total weight of the airframe is estimated by having a water pressure sensor inside of the chemical tank and estimating weight of chemicals in the chemical tank.

The embodiments of the drone for the purpose of chemical spraying are described. However, the present invention is also applied widely to agricultural drones which do not carry out chemical spraying and monitor growth with a camera, and general drones, for example.

(Technically Remarkable Effect of Present Invention)

According to the present invention, it becomes possible to improve the safety by maintaining the altitude, the speed or both of the autonomous drones intended for spraying agricultural chemicals within the predetermined range. In particular, the purpose of improving safety is similarly achieved although a person does not always pay attention during autonomous flight. Because of multiplexed configuration, continuous usage is possible while certain sensors (for example, GPS) are temporarily unavailable. Since the altitude restriction and the speed restriction are adjustable in accordance with changes of the airframe weight due to chemical consumption, efficient chemical spraying becomes possible.

The invention claimed is:

1. A drone, comprising: an altitude measurement unit, an altitude adjustment unit, and a weight measurement unit;
   wherein the altitude adjustment unit adjusts an airframe altitude, measured by the altitude measurement unit according to an overall drone weight, measured by the weight measurement unit, in order for the airframe altitude not to exceed a predetermined marginal altitude, and
   wherein the altitude adjustment unit further adjusts the predetermined marginal altitude according to the overall drone weight, measured again by the weight measurement unit, and changes a marginal altitude to be higher when the overall drone weight measured by the weight measurement unit is lighter than at the time of measurement in a past.

2. The drone according to claim 1, wherein the weight measurement unit measures the airframe weight based on any one or more of the following:
   a relation between a target rotation speed instructed to a motor and an acceleration measured by an acceleration sensor;
   a relation between the target rotation speed instructed to the motor and the acceleration measured by GPS coordinates;
   a relation between a rotation speed of a rotor blade and the acceleration measured by the acceleration sensor;
   a relation between the rotation speed of the rotor blade and the acceleration measured by the GPS coordinates;
   a forward tilt angle of the airframe during a constant velocity horizontal flight; and
   a liquid amount of loaded chemicals.

3. The drone according to claim 1, comprising:
   a climbing speed measurement unit measuring a climbing speed of the airframe; and
   a climbing speed adjustment unit adjusting the climbing speed of the airframe for not to exceed a marginal climbing speed in order for the airframe altitude not to exceed the marginal altitude.

4. The drone according to claim 1, wherein the altitude measurement unit measures an absolute altitude of the airframe by using the GPS during a take-off and measures a ground altitude of the airframe by using a ground altitude measuring unit while moving over a farm field.

5. The drone according to claim 4, wherein the ground altitude measurement unit is a sonar.

6. The drone according to claim 4, wherein the altitude adjustment unit adjusts the airframe altitude not to exceed a second marginal altitude, lower than the predetermined marginal altitude, while the altitude measurement unit measures the absolute altitude of the airframe by using the GPS.

7. The drone according to claim 1, further comprising: a speed measurement unit and a speed adjustment unit;
   wherein the speed adjustment unit adjusts an airframe speed, measured by the speed measurement unit in order for the airframe speed not to exceed a predetermined marginal speed.

8. The drone according to claim 7, wherein the speed measurement unit comprises two or more methods and multiplexed, selected from an acceleration sensor, a GPS doppler, or a GPS.

9. The drone according to claim 1, further comprising an airframe control unit, wherein the airframe control unit maintains the airframe hovering or lands the airframe when a GPS is not used for more than a specified time.

10. The drone according to claim 1, comprising multiple GPS receivers, wherein each of the multiple GPS receivers is controlled to use a different GPS satellite for each.

11. A non-transitory computer-readable storage medium that stores a computer-executable program for controlling a drone, the program comprising:
    an altitude measuring instruction to measure an airframe altitude;
    a weight measuring instruction to measure an overall drone weight;
    an altitude adjusting instruction to adjust the airframe altitude according to the overall drone weight, measured based on the weight measuring instruction in order for the measured airframe altitude not to exceed a predetermined marginal altitude; and
    wherein the altitude adjusting instruction further adjusts the predetermined marginal altitude according to the overall drone weight, measured again based on the weight measuring instruction, and changes a marginal altitude to be higher when the measured overall drone weight is lighter than at the time of measurement in a past.

12. The non-transitory computer-readable storage medium according to claim 11, further comprising:
   a climbing speed measuring instruction to measure a climbing speed of the airframe; and
   a climbing speed adjusting instruction to adjust the climbing speed of the airframe for not to exceed a marginal climbing speed in order for the airframe altitude not to exceed the marginal altitude.

13. The non-transitory computer-readable storage medium according to claim 11, wherein the altitude measuring instruction measures an absolute altitude of the airframe by using a GPS during a take-off and measures a ground altitude by using a ground altitude measuring unit while moving over a farm field.

* * * * *